(12) United States Patent
Kadosh et al.

(10) Patent No.: US 10,680,964 B1
(45) Date of Patent: Jun. 9, 2020

(54) RATE LIMITING IN A MULTI-CHASSIS ENVIRONMENT BY EXCHANGING INFORMATION BETWEEN PEER NETWORK ELEMENTS

(71) Applicant: MELLANOX TECHNOLOGIES TLV LTD., Ra'anana (IL)

(72) Inventors: Matty Kadosh, Hadera (IL); Aviv Kfir, Nili (IL); Jacob Ruthstein, Mazor (IL); Liron Mula, Ramat Gan (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 26 days.

(21) Appl. No.: 16/199,288

(22) Filed: Nov. 26, 2018

(51) Int. Cl.
*H04L 12/891* (2013.01)
*H04L 12/819* (2013.01)
*H04L 12/813* (2013.01)

(52) U.S. Cl.
CPC .............. *H04L 47/41* (2013.01); *H04L 47/20* (2013.01); *H04L 47/215* (2013.01)

(58) Field of Classification Search
CPC ........ H04L 47/10; H04L 47/11; H04L 47/115; H04L 47/12; H04L 47/122; H04L 47/125; H04L 47/20; H04L 47/22; H04L 47/225; H04L 47/41; H04L 47/21; H04L 47/215
See application file for complete search history.

(56) References Cited

U.S. PATENT DOCUMENTS

| | | | |
|---|---|---|---|
| 7,680,049 B2 | 3/2010 | Olsen et al. | |
| 8,032,653 B1 | 10/2011 | Liu et al. | |
| 8,059,638 B2 | 11/2011 | Nam et al. | |
| 8,077,611 B2 | 12/2011 | Bettink et al. | |
| 8,102,760 B2 | 1/2012 | Rose et al. | |
| 8,139,492 B1 | 3/2012 | Peterson et al. | |
| 8,792,501 B1 | 7/2014 | Rustagi et al. | |
| 9,306,804 B2 | 4/2016 | Duda et al. | |

(Continued)

FOREIGN PATENT DOCUMENTS

WO 2012149105 A1 11/2012

OTHER PUBLICATIONS

Heinanen et al., "A Single Rate Three Color Marker", Request for Comments: 2697, pp. 1-6, Sep. 1999.

(Continued)

*Primary Examiner* — Kevin D Mew
(74) *Attorney, Agent, or Firm* — Kligler & Associates Patent Attorneys Ltd (57) ABSTRACT

A network element connects over a network to a network node via a member link of a Multi-Chassis—Link Aggregation Link Group (MC-LAG), and further connects, using inter-peer ports, to peer network elements coupled to the network node via other MC-LAG member links. A processor of the network element is configured to receive from the network first packets destined to the network node, to receive via the inter-peer ports information indicative of second packets received from the network by the peer network elements that are destined to the network node, to select at least some of the first packets for transmission at an egress rate that jointly with egress rates of the peer network elements does not exceed a predefined MC-LAG maximal rate, based on the first packets and the information, and to transmit the selected first packets to the network node at the egress rate.

20 Claims, 5 Drawing Sheets

(56) References Cited

U.S. PATENT DOCUMENTS

| | | | |
|---|---|---|---|
| 9,369,408 B1 | 6/2016 | Raghavan et al. | |
| 9,594,621 B1 | 3/2017 | Navilappa | |
| 2005/0074007 A1* | 4/2005 | Samuels | H04L 1/1887 |
| | | | 370/392 |
| 2006/0133279 A1 | 6/2006 | Le Faucheur et al. | |
| 2008/0181196 A1 | 7/2008 | Regan et al. | |
| 2008/0291826 A1* | 11/2008 | Licardie | H04L 47/10 |
| | | | 370/230 |
| 2008/0291927 A1* | 11/2008 | Yong | H04L 47/10 |
| | | | 370/400 |
| 2010/0165986 A1* | 7/2010 | Bou-Diab | H04L 12/2881 |
| | | | 370/389 |
| 2011/0075562 A1 | 3/2011 | Isaksson et al. | |
| 2012/0236730 A1* | 9/2012 | Zhou | H04L 45/245 |
| | | | 370/244 |
| 2012/0314715 A1 | 12/2012 | Janardhanan | |
| 2013/0028072 A1* | 1/2013 | Addanki | H04L 41/0659 |
| | | | 370/218 |
| 2013/0250961 A1 | 9/2013 | Wu et al. | |
| 2013/0258838 A1* | 10/2013 | Colven | H04L 49/552 |
| | | | 370/218 |
| 2014/0269380 A1* | 9/2014 | Rusak | H04L 43/0811 |
| | | | 370/252 |
| 2015/0163146 A1* | 6/2015 | Zhang | H04L 47/125 |
| | | | 370/238 |
| 2017/0163473 A1* | 6/2017 | Sadana | H04L 41/0672 |
| 2017/0230294 A1* | 8/2017 | Saksena | H04L 47/12 |
| 2018/0316605 A1* | 11/2018 | Hallivuori | H04L 47/225 |
| 2019/0123961 A1* | 4/2019 | Fedyk | H04L 47/125 |

OTHER PUBLICATIONS

Wikipedia, "Traffic policing (communications)", pp. 1-4, Jul. 3, 2017 (https://en.wikipedia.org/wiki/Traffic_policing_(communications)).

IEEE 802.1AX™, "IEEE Standard for Local and metropolitan area networks—Link Aggregation", pp. 1-163, Nov. 3, 2008.

IEEE P802.1aq/D4.6., "Draft Standard for Local and Metropolitan Area Networks—Media Access Control (MAC) Bridges and Virtual Bridged Local Area Networks—Amendment XX: Shortest Path Bridging", pp. 1-363, Feb. 10, 2012.

IEEE 802.1AX-2014 (revision of IEEE Std 802.1AX-2008), "IEEE Standard for Local and metropolitan area networks—Link Aggregation", pp. 1-344, Dec. 24, 2014.

* cited by examiner

RATE LIMITING IN A MULTI-CHASSIS ENVIRONMENT BY EXCHANGING INFORMATION BETWEEN PEER NETWORK ELEMENTS

TECHNICAL FIELD

Embodiments described herein relate generally to communication networks, and particularly to methods and systems for rate limiting in a multi-chassis environment.

BACKGROUND

Multi-Chassis—Link Aggregation Group (MC-LAG or MLAG) is a type of a Link Aggregation Group (LAG) in which the constituent ports terminate on separate chassis. MC-LAG is primarily used for providing redundancy for cases in which one of the chassis fails. Implementations of MC-LAG may be based on the LAG standard, which is specified, for example, in "IEEE 802.1AX-2008—IEEE Standard for Local and metropolitan area networks—Link Aggregation," Nov. 3, 2008. The standard IEEE 802.1aq, 2012, titled "Shortest Path Bridging," provides alternative specifications to the MC-LAG.

Methods for handling a MC-LAG are known in the art. For example, U.S. Patent Application Publication 2012/0314715 describes systems and methods for implementing a multi-chassis link aggregation group (MLAG) in a network. This may be achieved by connecting at least two switches to a plurality of servers, with at least one logical bridging device and at least one MLAG configured in between the network and the plurality of servers. The at least one logical bridging device may be associated with the at least one MLAG. The system may include at least one MLAG per logical bridging device, but may include more MLAGs than logical bridging devices.

U.S. Pat. No. 8,032,653 describes a method for allocating bandwidth in a network appliance that includes a plurality of guaranteed bandwidth buckets used to evaluate when to pass traffic through the network appliance. The method includes providing a shared bandwidth bucket associated with a plurality of the guaranteed bandwidth buckets, allocating bandwidth to the shared bandwidth bucket based on the underutilization of bandwidth in the plurality of guaranteed bandwidth buckets and sharing excess bandwidth developed from the underutilization of the guaranteed bandwidth allocated to the individual guaranteed bandwidth buckets.

U.S. Patent Application Publication 2006/0133279 describes a hierarchical multi-rate multi-precedence policer that discards packets based on assigned precedence levels. When traffic exceeds an available service rate, the policer drops packets of lower precedence levels to make room for packets of higher precedence levels. In certain implementations, the policer also guarantees bandwidth to each level, thus preventing complete loss of lower precedence traffic when there is a large amount of higher precedence traffic.

SUMMARY

An embodiment that is described herein provides a network element that includes multiple ports and a processor. The multiple ports are configured to connect to a communication network, including: an output port that connects to a network node via a first member link of a Multi-Chassis—Link Aggregation Link Group (MC-LAG), and one or more inter-peer ports that connect to one or more peer network elements that are connected to the network node via other member links of the MC-LAG. The processor is configured to receive via one or more input ports first packets that are destined to the network node, the first packets having a first ingress rate, to receive via the one or more inter-peer ports information indicative of at least some of second packets that the peer network elements receive from the communication network at respective second ingress rates and that are destined to the network node, to select at least some of the received first packets for transmission to the network node at an egress rate that jointly with egress rates of the peer network elements does not exceed a maximal rate predefined for the MC-LAG, based on the first packets and the information received from the peer network elements, and to transmit the selected first packets to the network node via the first member link at the egress rate.

In some embodiments, the first packets have respective first sizes, the information received from the peer network elements includes respective second sizes of at least some of the received second packets, and the processor is configured to select the at least some of the first packets for transmission to the network node based on the first sizes and the second sizes. In other embodiments, he processor is configured to select the at least some of the first packets by accumulating tokens at the maximal rate, determining a token level of the accumulated tokens, consuming at least some of the accumulated tokens based on the token level, the first sizes and the second sizes, and selecting a first packet that has been consumed. In yet other embodiments, the processor is configured to consume a first size of a first packet or a second size of a second packet, when the token level is larger than or equal to the first size or the second size, respectively.

In an embodiment, the processor is configured to consume a first size of a first packet when the token level is larger than or equal to the first size, and to consume a second size of a second packet even when the token level is smaller than the second size. In another embodiment, the processor is configured to select a first packet for transmission when the token level is larger than or equal to a size of the first packet, and to discard the first packet otherwise. In yet another embodiment, the processor is configured to accumulate first tokens at the maximal rate, and second tokens including excessive first tokens above a predefined burst size, and to consume the accumulated first and second tokens based on second sizes of the second packets and first sizes of the first packets, respectively.

In some embodiments, the at least some of the second packets include second packets that the peer network elements actually egress to the other member links. In other embodiments, the processor is configured to report a first size of a received first packet to one or more peer network elements, by mirroring a header of the first packet that carries the first size, via the inter-peer ports.

There is additionally provided, in accordance with an embodiment that is described herein, a method for communication, including, in a network element that connects to a communication network using multiple ports, including an output port that connects to a network node via a first member link of a Multi-Chassis—Link Aggregation Link Group (MC-LAG), and one or more inter-peer ports that connect to one or more peer network elements that are connected to the network node via other member links of the MC-LAG, receiving via one or more input ports first packets that are destined to the network node, the first packets having a first ingress rate. Information is received via the one or more inter-peer ports, the information is indicative of at least some of second packets that the peer network elements receive from the communication network at respective second ingress rates and that are destined to the network node. At least some of the first packets are selected for transmission to the network node at an egress rate that jointly with egress rates of the peer network elements does not exceed a maximal rate predefined for the MC-LAG, based on the first packets and the information received from the peer network elements. The selected first packets are transmitted to the network node via the first member link at the egress rate.

There is additionally provided, in accordance with an embodiment that is described herein, an apparatus for communication that includes multiple network elements, coupled to a network node in a Multi-Chassis—Link Aggregation Link Group (MC-LAG) configuration. Each of the network elements is configured to receive from a communication network packets that are destined to the network node over the MC-LAG, the received packets having a respective ingress rate, to receive from the other network elements information indicative of at least some of the packets that the other network elements receive from the communication network and that are destined to the network node, to select at least some of the received packets for transmission to the network node at an egress rate that jointly with egress rates of the other network elements does not exceed a maximal rate predefined for the MC-LAG, based on the packets and the information received from the other network elements, and to transmit the selected packets to the network node via a member link of the MC-LAG at the egress rate.

There is additionally provided, in accordance with an embodiment that is described herein, a method for communication, including, in each of multiple network elements that are coupled to a network node in a Multi-Chassis—Link Aggregation Link Group (MC-LAG) configuration, receiving from a communication network packets that are destined to the network node over the MC-LAG, the received packets having a respective ingress rate. Information is received from the other network elements, the information is indicative of at least some of the packets that the other network elements receive from the communication network and that are destined to the network node. At least some of the received packets are selected for transmission to the network node at an egress rate that jointly with egress rates of the other network elements does not exceed a maximal rate predefined for the MC-LAG, based on the received packets and the information received from the other network elements. The selected packets are transmitted to the network node via a member link of the MC-LAG at the egress rate.

These and other embodiments will be more fully understood from the following detailed description of the embodiments thereof, taken together with the drawings in which:

DETAILED DESCRIPTION OF EMBODIMENTS

Overview

Embodiments that are described herein provide systems and methods for limiting the data rate transmitted by multiple chassis to a common network node in a MC-LAG configuration. Each of the multiple chassis may comprise a network element such as a switch or a router that connects to the network node using a respective member link (or a group of multiple member links) of the MC-LAG. In the disclosed embodiments, the overall data rate transmitted to the network node from the multiple chassis over the MC-LAG is constrained to a predefined maximal rate. MC-LAG can be used in various applications such as in a cloud environment in which the bandwidth consumed by a virtual machine is restricted.

Each of the network elements of the MC-LAG receives from the communication network packets at some ingress rate, and forwards at least some of the received packets to the network node at some egress rate, via a member link of the MC-LAG. In some embodiments, each network element controls the respective egress rate using a configurable rate limiter, also referred to herein as a policer. The data rates egressed by the network elements toward the network node should jointly be lower than or equal to the MC-LAG rate constraint.

In principle, each network element could limit its egress rate independently of any other network element of the MC-LAG. This approach, however, may fail to meet the MC-LAG rate limitation, e.g., when the sum of the individual ingress rates received by the network elements exceeds the maximal rate. With independent rate limitation among the network elements, the MC-LAG may also become underutilized, e.g., when the MC-LAG maximal rate is distributed (e.g., evenly) among the network elements.

In some disclosed embodiments, to achieve the MC-LAG constraint with full bandwidth utilization, the network elements coordinate rate limiting with other network elements of the MC-LAG, by exchanging suitable information with one another using Inter-Peer Links (IPLs).

In some embodiments, a network element receives from the communication network, via an input port (or multiple input ports,) packets that are destined to the network node. The packets received via the input port have a respective ingress rate. The network element further receives over the IPL information indicative of at least some of other packets that the peer network elements receive from the communication network, and that are destined to the network node. The network element controls its egress rate toward the network node based on the packets received via the input port and the information received from the peer network elements.

The network element controls the egress rate by selecting at least some of the packets received via the input port for transmission to the network node. Specifically, the network element discards packets so that the resulting egress rate together with the egress rates of the peer network elements does not exceed the maximal rate predefined for the MC-LAG. The network element transmits the selected packets to the network node via a respective member link at the egress rate.

In some embodiments, the information exchanged over the IPL comprises packet headers that carry the sizes of the packets in a length filed. In another embodiment, to reduce traffic bandwidth over IPL, the size of a given packet is extracted from the packet header and reported over the IPL, e.g., using some suitable format and/or packetizing method. Each network element thus adjusts its egress rate based on the packets directly received from the communication network and sizes of packets received from the communication by other network elements and reported via the IPL. The packet headers received via IPL are discards and not sent to the network node.

Mirroring packet headers to other network elements can be carried out in various ways. In a first variant embodiment, each network element reports via IPL the entire ingress traffic receives directly from the communication network, wherein the traffic ingressed by the network element is destined to a network node whose traffic needs to be policed. In a second variant embodiment, each network element reports via IPL only the traffic actually egressed toward the network node, which typically requires much less bandwidth over the IPL.

In the first variant embodiment, each network element produces an egress rate that is proportional to its ingress rate. For example, in a two-chassis case with ingress rates denoted IR1 and IR2, the network elements output packets at respective egress rates $ER1 \leq IR1 \cdot RC/(IR1+IR2)$ and $ER2 \leq IR2 \cdot RC/(IR1+IR2)$, wherein RC is the rate constraint of the MC-LAG, and the condition $ER1+ER2 \leq RC$ is thus satisfied. When the overall ingress rate IR1+IR2 is lower than RC, the network elements output all the received packets at the IR1 and IR2 rates.

In the second variant embodiment, the egress rates ER1 and ER2 also satisfy RC limitation, but the MC-LAG bandwidth is not necessarily distributed fairly among the network elements as in the first variant. In this case, the actual egress rates depend on the nature of the traffic exchanged among the network elements via the IPL.

In some embodiments, the policer of the network element is implemented using a token bucket. The policer fills the bucket with tokens at the RC rate, and consumes tokens from the bucket in accordance with packet size. In the first variant embodiment, the policer consumes tokens, when available, for both packets that are received directly from the communication network, and packets received by other network elements and reported via the IPL. In the second variant embodiment, the policer applies a different consumption policy to packets reported via IPL. Specifically, because packets reported via IPL were actually egressed by peer network elements, the policer consumes tokens for these packets even when the available token level is insufficient.

In the disclosed techniques, network elements coordinate with one another rate limiting so as to meet the MAC-LAG rate constraint with full bandwidth utilization. The network elements efficiently report to other network elements information indicative of their ingress or egress rates, by sending only packet headers that carry the packets sizes.

System Description

Figure 1:
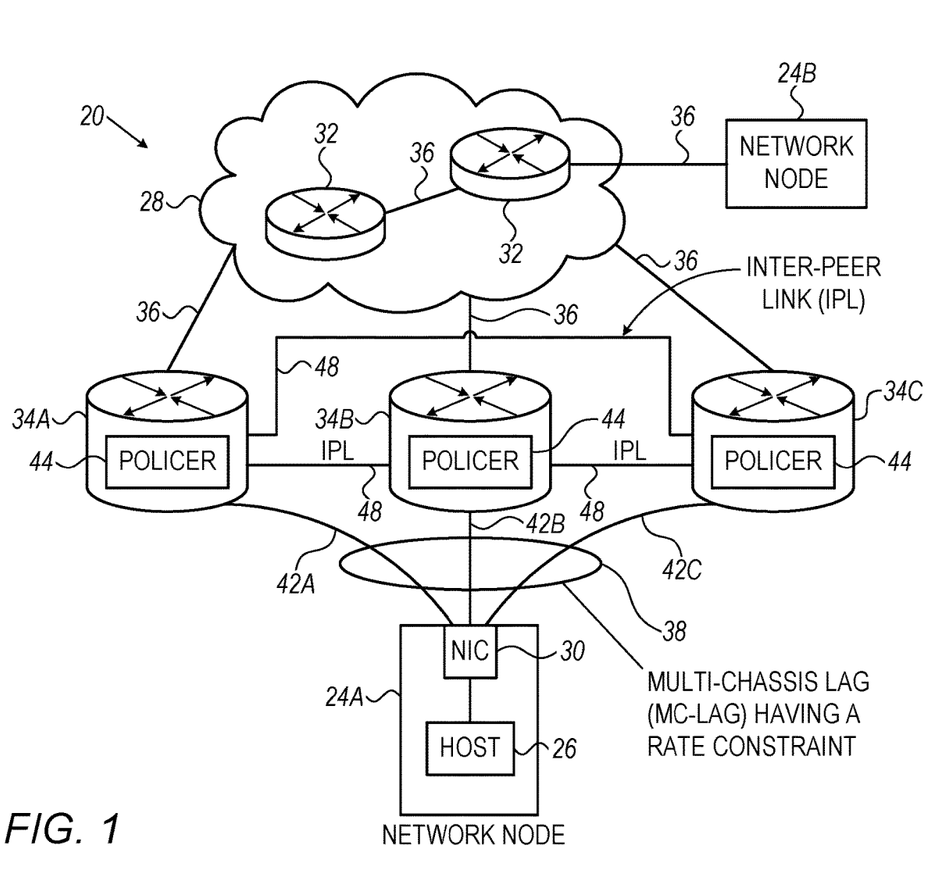
FIG. 1 is a block diagram that schematically illustrates a computation system in which a network node is coupled to a packet network in a Multi Cassis (MC) Link Aggregation Group (LAG) configuration, in accordance with an embodiment that is described herein.

FIG. 1 is a block diagram that schematically illustrates a computation system 20 in which network node 24A is coupled to packet network 28 in a Multi Cassis (MC) Link Aggregation Group (LAG) configuration, in accordance with an embodiment that is described herein. Packet network 28 is also referred to generally as a "communication network" or simply as "network," for brevity.

In computation system 20, network nodes such as 24A and 24B communicate with one another over packet network 28. As depicted in FIG. 1, with reference to network node 24A, each network node 24 comprises a host processor 26, and a Network Interface Controller (NIC) 30 via which the network node connects to the packet network. Computation system 20 may comprise, for example, a data center or a cloud computation system, in which at least some of the network nodes comprise computers, servers and/or storage systems or devices. As another example, system 20 can be used for controlling transmission bandwidth provided by an Internet Service Provider (ISP) to subscribers.

Packet network 28 may comprise any suitable packet network, operating using any suitable protocols. For example, packet network 28 may comprise an Internet Packet (IP) network employing the Transmission Control Protocol (TCP) for the transport layer, such as the Internet. Alternatively, packet network 28 comprises, for example, an Ethernet network or an Infiniband™ network.

Packet network 28 comprises network elements 32 that connect to one another and possibly to other elements such as network nodes 24 using links 36 comprising, for example, a wired link of any suitable type. Network elements 32 may comprise, for example, routers, switches, bridges, or any other suitable type of a network element. Network elements 32 may be interconnected in any suitable topology such as, for example, a Clos network, Torus, Mesh or Dragonfly topologies.

In FIG. 1, in addition to network elements 32, the packet network comprises multiple network elements 34 that are coupled to network node 24A in a Multi Chassis (MC) Link Aggregation Group (LAG) 38, using member links of the MC-LAG, wherein network elements 34 comprise the chassis of MC-LAG 38. Network elements 34 may be similar to network elements 32, and further comprise respective policers 44 that limit the data rates transmitted over respective member links 42 toward network node 24A.

In an embodiment, each of member links 42 of the MC-LAG comprises a single physical link. Network elements 34 may be coupled, using links 36, to a common network element 32 of packet network 28, or to multiple different network elements 32.

In the present example, MC-LAG 38 comprises three member links denoted 42A, 42B and 42C, each of which connects at one end to NIC 30 of network node 24A and at the other end to a respective network element 34A, 34B or 34C. Alternatively, MC-LAG 38 may comprise any other suitable number of chassis such as a two-chassis MC-LAG, or a MC-LAG having more than three chassis.

Network node 24A may establish and manage MC-LAG 38 using any suitable method. For example, a network administrator may configure the member links of MC-LAG 38 manually using static configuration. In an alternative embodiment, network node 24A may set up and manage the MC-LAG dynamically, using a suitable protocol such as, for example, the Link Aggregation Control Protocol (LACP), which is specified, for example, in "IEEE Standard 802.1AX-2014 (Revision of IEEE Standard 802.1AX- 2008)—IEEE Standard for Local and metropolitan area networks—Link Aggregation," Dec. 24, 2014. Network node 24A may implement the LACP in various ways. For example, the LACP implementation may be implemented by one of NIC 30 and host processor 26, or partitioned between NIC 30 and host processor 26.

MC-LAG 38 typically supports bidirectional communication with network node 24A. In the network node direction, network elements 34 receive packets from packet network 28 and forward received packets destined to network node 24A over respective member links 42 of MC-LAG 38. NIC 30 aggregates the received packets and forwards the aggregated packets to host processor 26. Alternatively, aggregating the packets is carried out by the host processor or partitioned between the NIC and the host processor. In the opposite direction, network node 24A sends packets toward packet network 28 over one or more member links 42 of MC-LAG 38 and respective network elements 34. In both directions, network element 34 forwards a received packet to the packet's destination based, for example, on addressing information carried in headers of the packet.

Network elements 34 further connect with one another using Inter-Peer Links (IPLs) 48, which may have the same or different physical structure as link 36. Each of IPLs may comprise a single physical link or multiple physical links for increased bandwidth. The communication protocol used by network elements 34 for communicating over IPL is typically vendor specific. Network elements may communicate over the IPL management information such as routing tables, or information used for managing redundancy over the MC-LAG. In some embodiments, the network elements communicate over IPL information that is used for coordinating rate limiting among the network elements.

In some embodiments, the overall data rate over the MC-LAG toward network node 24A is restricted to some maximal rate. In some embodiments, network elements 34 exchange with one another, over IPL, information that is indicative of their respective ingress data rates. More specifically, a network element reports over IPL part of the ingress traffic destined to the target node (24A), or possibly to a specific application or a virtual machine running on the target node. In an embodiment, each network element 34 receives from the other network elements 34, via IPL, information comprising headers of at least some of the packets received by these other network elements from the packet network. The headers carry the sizes of the packets in a packet-length field. Sending over IPL only the packets headers (i.e., not including packet's payload) significantly reduces the traffic bandwidth over the IPL.

Each of network elements 34 comprises a policer 44 that limits the egress rate over the respective member link, based on the ingress rate of the network element and the information received from the peer network elements. The information exchanged among network elements 34 enables the respective policers to coordinate the egress rates to jointly meet the maximal rate over the MC-LAG. Example policer embodiments will be described in detail below.

Figure 2:
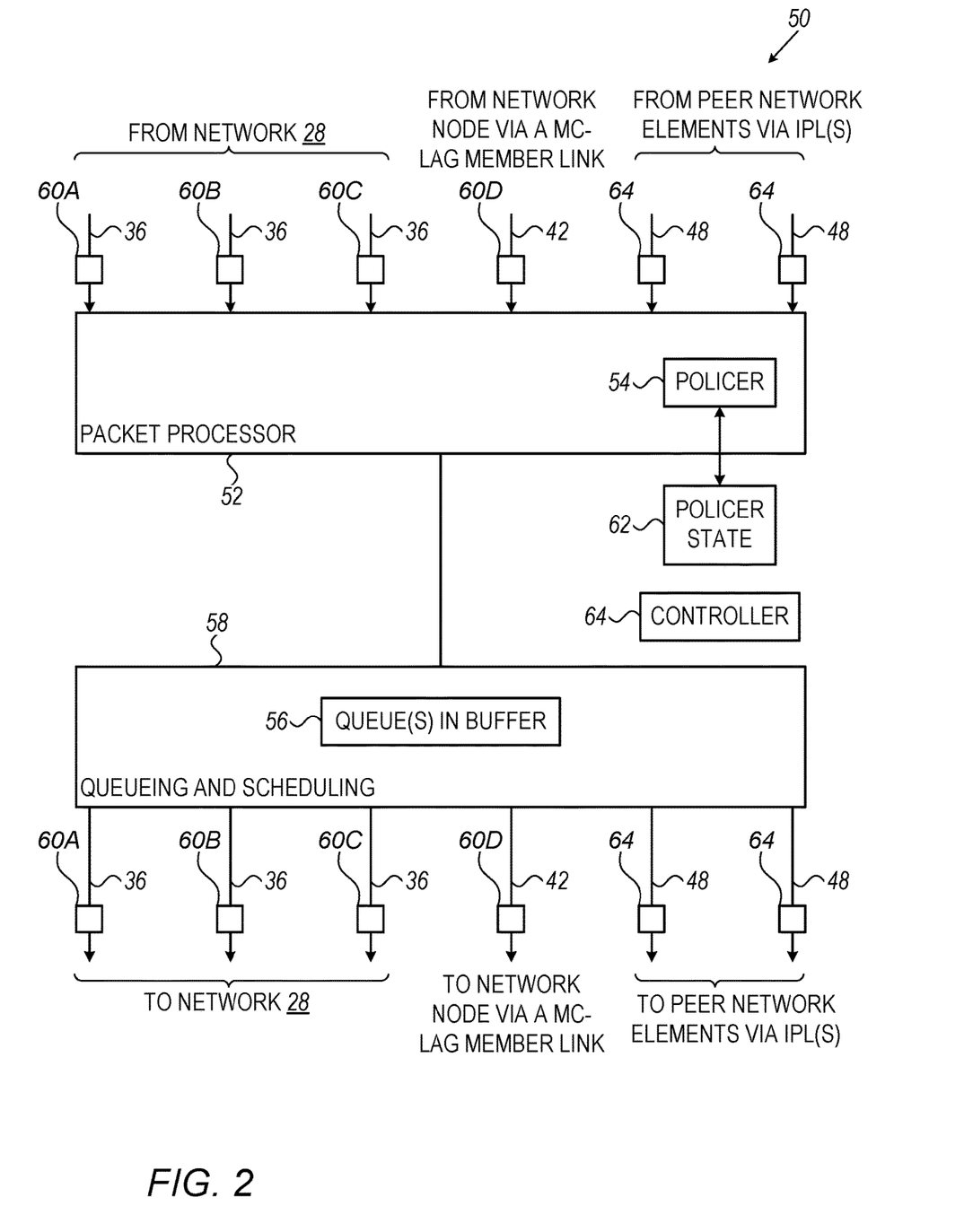
FIG. 2 is a block diagram that schematically illustrates a network element that supports egress rate limitation over a MC-LAG, in accordance with an embodiment that is described herein.

FIG. 2 is a block diagram that schematically illustrates a network element 50 that supports egress rate limitation over a MC-LAG, in accordance with an embodiment that is described herein. Network element 50 can be used, for example, in implementing network elements 34 of FIG. 1.

Network element 50 comprises multiple ports 60 for connecting to network elements 32 in packet network 28 via links 36, and to network node 24A via member link 42. Each port 60 comprises a suitable mechanical connector (not shown) for coupling to a link 36 or to member link 42, and electrical circuit (not shown) for transmitting and receiving packets to and from the packet network or network node 24A. In a typical implementation, port 60 functions both as an input port for receiving packets, and as an output port for transmitting packets. In FIG. 2, for the sake of clarity, the input and output parts of each port 60 are depicted separately. In the example of FIG. 2, ports 60A, 60B and 60C connect to packet network 28, and port 60D connects to network node 24A via a member link 42 of a MC-LAG 38.

Network element 50 further comprises one or more inter-peer ports 64 for connecting to peer network elements of the MC-LAG via respective IPLs 48. Inter-peer port(s) 64 may have the same or different mechanical and/or electrical functionalities as ports 60. In FIG. 2, for the sake of clarity, the input and output parts of each port 64 are depicted separately.

Network element 50 comprises a packet processor 52 that comprises a policer 54. In some embodiments, policer 54 implements the functionality of policer 44 of FIG. 1. In FIG. 2, policer 54 is implemented as part of the packet processor. Alternatively, part or all of the policer functionality may be implemented externally to the packet processor.

Policer 54 is coupled to a policer state 62 that is updated based on incoming traffic from network 28 and on the information received from peer network elements over IPL. In some embodiments, policer 54 decides, on a packet-by-packet basis, whether a received packet is to be queued for transmission or discarded, based on the policer state. As will be described in detail below, the policer may be implemented using token bucket techniques, in which case the policer state comprises a token level of the token bucket.

Packet processor 52 processes incoming and outgoing packets. In the ingress direction, the packet processor applies to packets received in the network element via ports 60 and inter-peer ports 64, various processing such as verifying the correctness of the data in the packet payload, packet classification and prioritization, and routing. The packet processor typically checks certain fields in the packets headers for the purpose of packet classification and routing. The header fields contain addressing information, such as source and destination addresses and TCP or UDP port numbers, and the underlying network protocol used. In some communication protocols, the headers contain a length field that carries the packet's size.

The packet processor stores processed packets that are awaiting transmission in one or more queues 56. In the example of FIG. 2, queues 56 reside in a queuing and scheduling module 58. In some embodiments, queues 56 are implemented in a buffer such as a shared buffer that dynamically manages queueing resources within the network element. The buffer storing the queues may comprise, for example, a Random Access Memory (RAM), or any other type of memory using any suitable storage technology.

In the egress direction towards the packet network, queueing and scheduling module 58 schedules the transmission of packets stored in queues 56 via ports 60 using any suitable arbitration scheme, such as, for example, a round-robin scheduling scheme. In the egress direction towards network node 24A via member link 42, the queueing and scheduling module schedules packets transmission at a rate determined by policer 54, which possibly discards some of the packets received (and destined to the network node) to meet the maximal rate constraint.

In some embodiments, policer 54 applies policing decisions directly to the ingress traffic, e.g., after or during classification of the received packets. In such embodiments, the policer discards packets, for controlling the egress eate, by avoiding queueing these packets in queues 56 for transmission.

Network element 50 comprises a controller 66, which performs various management and packet-processing functions for the network element. For example, controller 66 configures packet processor 52 to apply the desired routing plan. In some embodiments, controller 66 sets one or parameters in policer 54 to determine the desired policer configuration.

Policer 54 may limit the data rate using any suitable method. In some embodiments, policer 54 is implemented using token bucket methods such as specified, for example, in a Request for Comments (RFC) 2697 titled "A Single Rate Three Color Marker," September 1999.

In some embodiments, policer 54 is implemented using a token bucket that fills with tokens at the MC-LAG maximal rate and consumes tokens based on the sizes of both the packets received directly from the packet network and the sizes of the packets whose headers are reported via IPL. In one embodiment, the network element measures the sizes of the packets received from the packet network by counting the number of data units (e.g., bits or bytes) received within packet boundaries. Alternatively, the network element extracts the sizes of packets received from the packet network from a length field in the packet header.

The configurations of computation system 20, MC-LAG 38, network elements 34 and 50, and policers 44 and 54 are example configurations, which are chosen purely for the sake of conceptual clarity. In alternative embodiments, any other suitable configurations can also be used. The different elements of network element 34, network element 50, policer 44 and/or policer 54 may be implemented in hardware, such as using one or more Application-Specific Integrated Circuits (ASICs) or Field-Programmable Gate Arrays (FPGAs). In alternative embodiments, some elements of network element 34, network element 50, e.g., policer 44, policer 54, packet processor 52 and/or controller 66, may be implemented in software executing on a suitable processor, or using a combination of hardware and software elements.

In some embodiments, packet processor 52, policer 44 and/or policer 54 may comprise a general-purpose processor, which is programmed in software to carry out the network element and/or policer functions described herein. The software may be downloaded to the processor in electronic form, over a network, for example, or it may, alternatively or additionally, be provided and/or stored on non-transitory tangible media, such as magnetic, optical, or electronic memory.

Managing a MC-Lag Having a Rate Constraint

Figure 3:
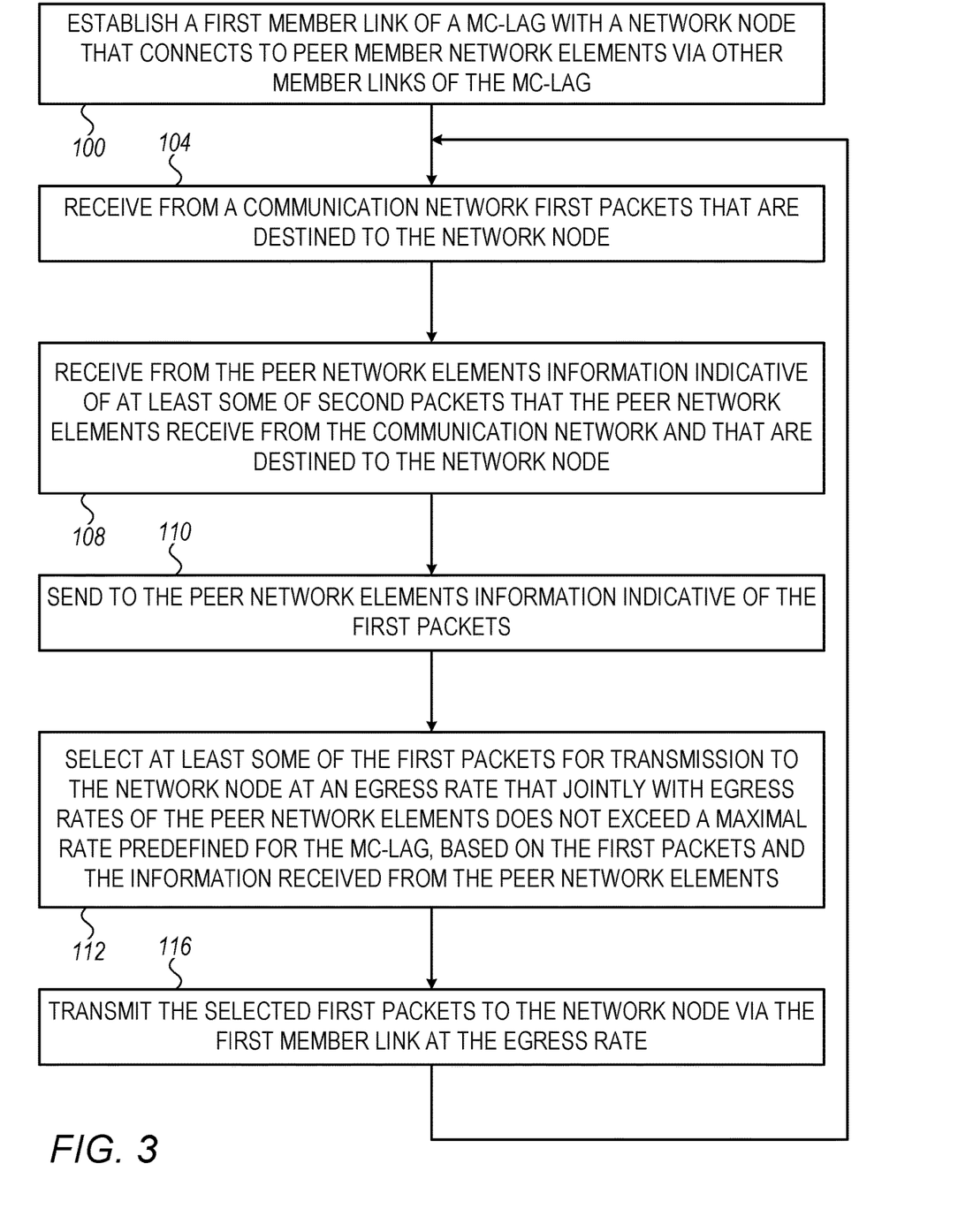
FIG. 3 is a flow chart that schematically illustrates a method for limiting a total data rate over a MC-LAG, in accordance with an embodiment that is described herein.

FIG. 3 is a flow chart that schematically illustrates a method for limiting a total data rate over a MC-LAG, in accordance with an embodiment that is described herein. The method will be described as being executed by network element 34A of FIG. 1 (e.g., implemented using network element 50 of FIG. 2.)

The method begins with controller 66 of network element 34A establishing a first member link 42A of MC-LAG 38 with network node 24A, at an MC-LAG establishment step 100. In the example of FIG. 1, network node 24A additionally connects to peer network elements 34B and 34C via respective member links 42B and 42C of the MC-LAG. The network node may establish member link 42A, as well as member links 42B and 42C using any suitable method or protocol, such as using the LACP mentioned above.

At an ingress reception step 104, network element 34A receives packets from packet network 28 via one or more input ports, such as ports 60A . . . 60C. The packets received at step 104 and that are destined to the network node are also referred to as "first packets." Packet processor 52 processes the received packets and stores the processed packets that are destined to network node 24A in queues 56. Packet processor 52 determines the sizes of the queued packets, e.g., by measuring the amount of data units (e.g., bits or bytes) received within the packets boundaries.

At an inter-peer reception step 108, policer 44 of network element 34A receives from the peer network elements 34B and 34C, over IPLs 48, information indicative of at least some of the packets that the peer network elements receive from the communication network and that are destined to network node 24A via respective member links 42B and 42C, which packets are also referred to herein as "second packets". In the present example, network element 34A receives information from each of peer elements 34B and 34C via inter-peer port(s) 64.

At an inter-peer transmission step 110, policer 44 of network element 34A sends to peer network elements 34B and 34C, via inter-peer port(s) 64, information indicative of the first packets of step 104. Using the information received from the other network elements the policer of network element 34A coordinates with the policers of network elements 34B and 34C, the egress rate over member link 42A, so as to limit the overall data rate over the MC-LAG to a desired maximal rate.

In some embodiments, the information received by network element 34A via the inter-peer ports contains packet headers that include a packet length field. Alternatively, the information contains only the values in the length fields of the packets and not the full headers. As will be described below, in one variant embodiment, the information received from peer network element 34B (or 34C) contains headers of (typically all of) the packets received by that network element from the communication network and that are destined to network node 24A. In another variant embodiment, the information received from peer network element 34B (or 34C) contains headers of (typically all of) the packets received by that network element from the communication network and that are actually egressed to network node 24A. Note that network element 34A uses the packet headers received only for adjusting the egress rate. The network element discards the packet headers and does not send the packet headers to the network node. Similarly, in the embodiment in which the packet sizes are sent over IPL, the network element discards the packet sizes and does not sent them to the network node.

At an egress rate control step 112, policer 44 of network element 34A controls the egress rate for transmission over member link 42A to network node 24A, based on the first packets received at step 104 that are destined to network node 24A, and the information received from the peer network elements via the IPLs. In some embodiments, the policer selects at least some of the first packets for transmission to the network node at an egress rate that jointly with egress rates of the peer network elements does not exceed the maximal rate predefined for the MC-LAG, based on the first packets and the information received from the peer network elements.

At a transmission step 116, the packet processor of network element 34A transmits the first packets that were selected by policer 44 at step 112 via member link 42A at the egress rate that was adjusted under the control of policer 44.

Following step 116 the method loops back to step 104 to receive subsequent packets from the communication network.

In some embodiments, network elements 34B and 34C operate in a similar manner to network element 34A as described above. In such embodiments, even though each of the network elements individually limits its own egress rate towards the network node, the information exchanged among the network elements enables them to limit their egress rates so that the joint egress rate over the MC-LAG does not exceed the desired maximal rate.

Coordinating Rate Limiting Among Peer Policers

Figure 4:
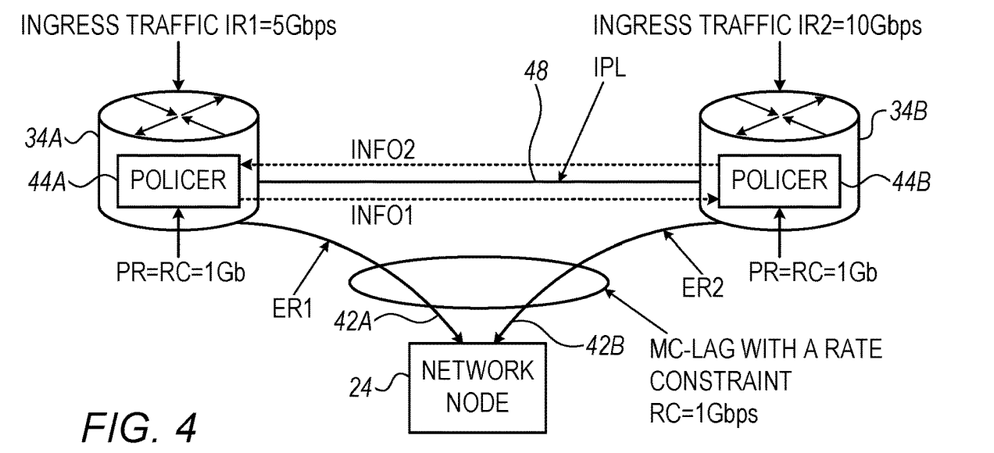
FIG. 4 is a diagram that schematically illustrates network elements coupled in a MC-LAG that is subject to a rate constraint, in accordance with an embodiment that is described herein.

FIG. 4 is a diagram that schematically illustrates network elements coupled in a MC-LAG that is subject to a rate constraint, in accordance with an embodiment that is described herein. The MC-LAG in FIG. 4 operates similarly to MC-LAG 38 described in FIG. 1, for a case of two chassis. The MC-LAG rate constraint is denoted RC, and is set in the present example to RC=1 Gbps.

In FIG. 4, network elements 34A and 34B receive ingress traffic from the communication network at respective ingress rates denoted IR1 and IR2. In the present example, IR1=5 Gbps and IR2=10 Gbps. Each of the network elements receives ingress traffic via one or more input ports. The ingress rates IR1 and IR2 refer to received packets that are destined to the network node via respective member links 42A and 42B.

Network elements 34A and 34B comprise policers 44 that limit the respective egress rates via member links 42A and 42B. The policers of network elements 34A and 34B limit the egress rates to respective values denoted ER1 and ER2. Since the overall rate over the MC-LAG is limited to RC, the policers should limit the respective egress rates ER1 and ER2 to satisfy the expression ER1+ER2≤RC. Note that when the overall ingress rate (IR1+IR2) is larger than RC, ER1+ER2 should be as close as possible to RC to fully exploit the available MC-LAG bandwidth.

Assume that each of the policers is configured to independently limit the egress rate to a policer rate PR=RC. Assume a policer receiving traffic at a rate IR. For each packet received from the communication network, the policer decides whether to forward the packet towards the network node or discard the packet, so that the instantaneous egress rate ER remains below the configured policer rate RC. The egress rate ER in this case satisfies $$\begin{cases} ER = IR, & \text{if } IR \leq RC \\ ER = RC, & \text{if } IR > RC \end{cases} \qquad \text{Equation 1}$$

Consider now embodiments in which a policer in one network element additionally receives information indicative of at least some of the packets received from the packet network by other network elements of the MC-LAG.

In one variant embodiment denoted VAR1, the policer in one network element takes into consideration the ingress traffic of the peer network elements, as reported via the IPL. In this case, the respective egress rates ER1 and ER2 are given by:

$$ER1 \leq IR1 \cdot [RC/(IR1+IR2')] \qquad \text{Equation 2}$$

$$ER2 \leq IR2 \cdot [RC/(IR2+IR1')] \qquad \text{Equation 3}$$

A policer that achieves the egress rate in Equations 2 or 3, which is implemented using a token bucket, will be described below.

In Equations 2 and 3, IR1 and IR2 denote the ingress rates of respective network elements 34A and 34B, and ER1 and ER2 denote the egress rates enforced by the policers of respective network elements 34A and 34B. In addition, IR1' and IR2' denote the ingress rates of network elements 34B and 34A, as indicated by the packet headers exchanged over IPL. Assuming that the packet headers accurately indicate the ingress rates, IR1=IR1' and IR2=IR2', in which case ER1 and ER2 in Equations 2 and 3 satisfy ER1+ER2≤RC. In the present example, the egress rates are given by ER1≤[1/(5+10)]=0.33 Gbps, for member link 42A, and ER2≤10·[1/(5+10)]=0.67 Gbps for member link 42B. The total rate over the MC-LAG is therefore limited to 0.33+067=1 Gbps.

The VAR1 embodiment can be extended to a MC-LAG having a number N>2 of member links. Let IRn denote the ingress rate of network traffic in the $n^{th}$ network element, wherein 1≤n≤N. Let IRm' (1≤m≤N, m≠n) denote the ingress rate of the $m^{th}$ network element as indicated by the headers of the packets received from the packet network by the $m^{th}$ network element, and reported to the $n^{th}$ network element via IPL. The policer of the $n^{th}$ network element produces an egress rate ERn as given by:

$$ERn \leq IRn \cdot \frac{RC}{IRn + \sum_{m=1, m \neq n}^{N} IRm'} \qquad \text{Equation 4}$$

Assuming accurate rate estimates, IRm=IRm' and we have:

$$ERn \leq IRn \cdot \frac{RC}{\sum_{k=1}^{N} IRk} \qquad \text{Equation 5}$$

In this case the overall data rate over the MC-LAG satisfies $$\sum_{n=1}^{N} ERn \leq RC.$$

As seen in Equation 5, even though the ingress rate at the $n^{th}$ network element is IRn, the policer weights IRn according to the overall ingress rate summed over network elements 34 of the MC-LAG. The VAR1 embodiment thus provides fairness among the network elements of the MC-LAG in the sense that the overall bandwidth of the MC-LAG is distributed among the network elements proportionally to their respective ingress rates.

Next we describe policer implementations that can be used in network elements operating in accordance with the VAR1 embodiment.

Figure 5A:
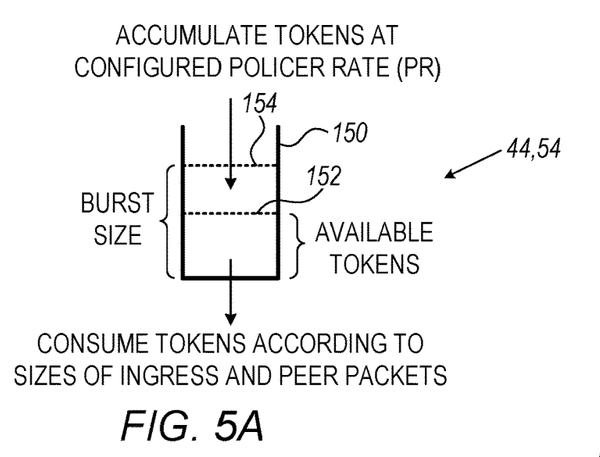
FIGS. 5A and 5B are a logical diagram and a block diagram that schematically illustrate single-bucket policers, in accordance with embodiments that are described herein.
Figure 5B:
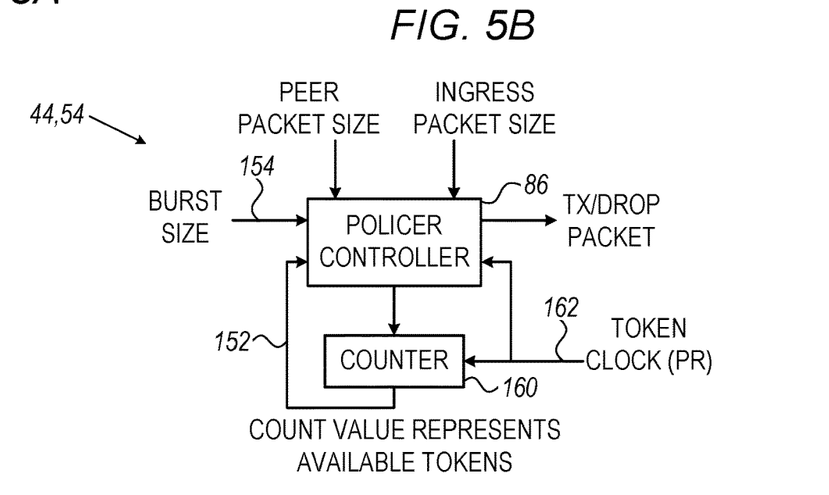

FIGS. 5A and 5B are a logical diagram and a block diagram that schematically illustrate single-bucket policers, in accordance with embodiments that are described herein. The single-bucket policers of FIGS. 5A and 5B can be used in implementing policers 44 and 54 of respective network elements 34 and 50 of FIGS. 1 and 2.

The single-bucket policer in FIG. 5A comprises a token bucket 150 that fills at a predefined policer rate denoted PR. In the present example, PR is set to the MC-LAG rate constraint, i.e., PR=RC. A token corresponds to a certain amount of data such as a byte, bit, or any other suitable data size. Dotted line 152 represents the number of available tokens in the bucket, also referred to herein as "token level." In FIG. 2 above, policer state 58 comprises the token level. In some embodiments, the maximal number of available tokens is up-limited to a level 154 denoted "burst size."

The policer consumes some or all of the accumulated tokens in accordance with two types of packets: (i) packets received in the network element directly from the packet network, also referred to herein as "directly-received packets," and (ii) packets received from the packet network by other network elements of the MC-LAG, and whose headers are reported to the policer of the given network element via IPL, also referred to herein as "peer-received packets." In the description that follows we describe policers suitable for the VAR1 and VAR2 variant embodiments described above. The policers in the VAR1 and VAR2 embodiments differ in the manner in which the policer consumes peer-received packets.

In the VAR1 embodiment, in response to receiving a packet from the packet network, or a header of a packet received by another network element, the single-bucket policer compares between the respective packet size and the token level. When detecting that the amount of data represented by the current token level is larger than or equal to the packet size, the policer consumes a number of tokens corresponding to the packet size, and the token level reduces by the number of tokens consumed. Otherwise, the token level is insufficient for consuming the packet size and the token level remains unchanged. The policer consumes a number of tokens (when available) that matches the packet size regardless of whether the packet was received directly or by a peer network element.

In some embodiments, in response to consuming the size of a directly-received packet, the policer (or packet processor) forwards that packet to the respective member link of the MC-LAG. Otherwise, the directly-received packet could not be consumed and the policer discards the directly-received packet. After checking the size of a peer-received packet for consuming, the policer discards the header of the peer-received packet, regardless of whether the peer-received packet was consumed or not.

FIG. 5B depicts a hardware implementation of the policer of FIG. 5A. In the block diagram of FIG. 5B, the token-bucket of the policer comprises a counter 160 whose count value represents the number of available tokens 152 (or the token level.) Counter 160 increments at the rate of the token clock signal 162, configured to PR.

The policer additionally comprises a policer controller 86 that handles limiting the maximal count value to the burst size, and consumes accumulated tokens based on the sizes of both directly-received and peer-received packets. In an embodiment, policer controller 86 reduces the count value of counter 160 by a number of tokens that is equivalent to the size of the relevant packet. In an embodiment, the policer controller comprises a comparator (not shown) for comparing the packet size of the directly-received packet or of the peer-received packet to the current token level. In the present example, the policer controller outputs a TX/DROP signal that indicates to the packet processor to forward a directly-received packet that has been consumed, or to discard the packet when could not be consumed, e.g., by avoiding queueing that packet.

In the VAR1 variant embodiment, the information reported over the IPL contains headers of the packets received by the peer network elements. Sending the headers of the packets requires much less bandwidth than sending the full packets. In the VAR2 variant embodiment, the data rate over IPL is further reduced compared to the VAR1 embodiment, by sending via IPL headers of only part of the peer-received packets, as described herein.

In the VAR2 embodiment, the peer network elements report via IPL the headers of the actually egressed packets. Since the peer network elements typically egress only a subset of the packets they receive from the packet network, the traffic bandwidth over IPL reduces significantly compared to the VAR1 embodiment. The packets egressed by a peer network element are also referred to herein as "peer-egressed packets."

With reference to FIGS. 5A and 5B, in the VAR2 embodiment, token bucket 150 handles directly-received packets similarly to the VAR1 embodiment as described above. The policer, however, handles peer-egressed packets using an always consume approach, because a peer-egressed packet is known to be egressed over the MC-LAG by a peer network element.

In applying the always consume approach of the VAR2 embodiment, in response to receiving a header of a peer-egressed packet, the policer consumes that packet even when the respective packet size is larger than the amount of dada represented by current token level, possibly causing the token level to reduce to a negative value. In some embodiments, policer controller 86 limits the maximal negative value of the token level to a predefined negative level, which depends (e.g., proportionally) on the communication latency via the IPL.

As an example, consider the MC-LAG of FIG. 4 above, in which policers 44 comprise single-bucket policers in accordance with the VAR2 embodiment. In the present example, the ingress rates of network elements 34A and 34B are IR1=5 Gbps and IR2=10 Gbps, respectively. In addition, the MC-LAG is limited to RC=1 Gbps, and policers 44A and 44B are configured to PR=1 Gbps.

Assume, for example, that the policer 44A produces an egress rate ER1=0.7 Gbps. Policer 44B receives via IPL the headers of the packets egressed by network element 34A and consumes the sizes of the respective packets at a 0.7 Gbps rate in an always consume mode. Policer 44B thus produces an egress rate ER2 of 1−0.7=0.3 Gbps. Policer 44B reports headers of the egressed packets at the 0.3 Gbps rate to policer 44A via IPL, which causes policer 44A to limit the egress rate ER1 to ER1=1−0.3=0.7 Gbps.

The combination of egress rates ER1=0.7 Gpbs and ER2=0.3 Gbps described above is given by way of example, and other egress rate combinations can be achieved, such as ER1=0.8 and ER2=0.2, or any other suitable rate combination. The actual egress rates ER1 and ER2 to which the policers converge depends, for example, on the size and order of the egressed packets that are exchanged between the network elements via the IPL. Note that regardless of the specific ER1 and ER2 rates to which the policers converge, the overall data rate over the MC-LAG is limited to ER1+ER2≤RC.

Although the VAR2 embodiment was described for a two-chassis MC-LAG case, the VAR2 embodiment can be similarly applied to an MC-LAG having more than two chassis.

Figure 6A:
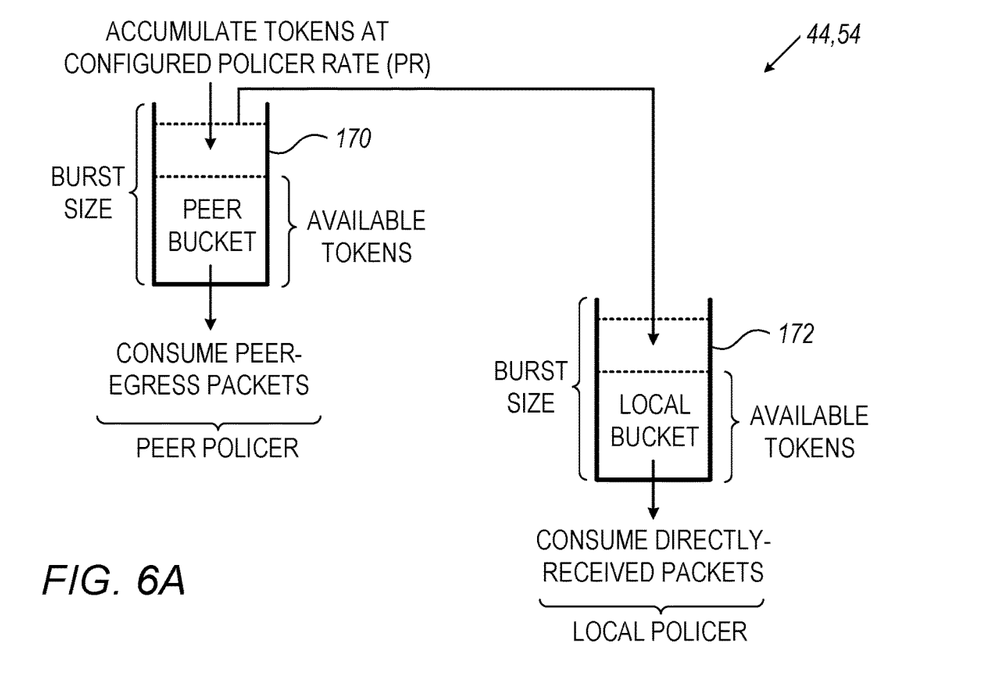
FIGS. 6A and 6B are a logical diagram and a block diagram that schematically illustrate double-bucket policers, in accordance with embodiments that are described herein.
Figure 6B:
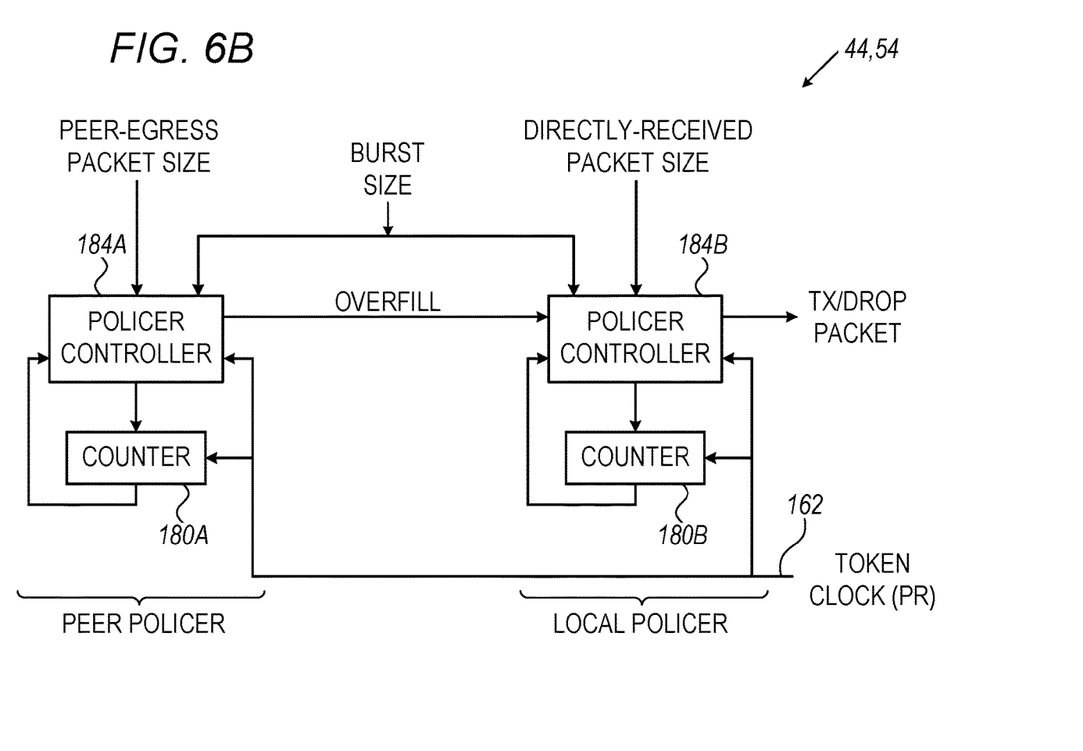

FIGS. 6A and 6B are a logical diagram and a block diagram that schematically illustrate double-bucket policers, in accordance with embodiments that are described herein.

The double-bucket policers of FIGS. 6A and 6B can be used in implementing policers 44 and 54 of respective network elements 34 and 50 of FIGS. 1 and 2, in the VAR2 embodiment.

The double-bucket policer in FIG. 6A comprises sub policers referred to herein as a "peer policer" and a "local policer." The peer policer and local policer comprise a peer bucket 170 and a local bucket 172, respectively, which are similar to token bucket 150 of FIG. 5A. The peer bucket accumulates tokens at a configurable rate PR (set to PR=RC), and consumes only peer-egressed packets. The local bucket accumulates excessive tokens of the peer bucket, i.e., tokens that would fill the peer bucket above the burst size, and consumes only directly-received packets. The minimal token level in each of the peer and local buckets is configured to a zero value. In FIG. 6A, the peer bucket controls the availability of tokens to be accumulated by the local bucket, and therefore emulates the always consume mode of operation in the VAR2 embodiment. By using the double-bucket structure, the effective burst size of the policer is, however, undesirably doubled.

FIG. 6B depicts a hardware implementation of the policer of FIG. 6A. In FIG. 6B, peer bucket 170 and local bucket 172 are implemented using respective counters 180A and 180B, which are incremented at a PR rate using a token clock signal 162. The peer policer and local policer comprise respective policer controllers 184A and 184B that limit the maximal count value of counters 180A and 180B to the burst size, and handle tokens consumption. Policer controller 184A (or 184B) consumes accumulated tokens in counter 180A (180B) by reducing the count value of counter 180A (180B) by a number of tokens that is equivalent to the size of a peer-egressed packet (or directly-received packet.)

In the embodiment of FIG. 6B, policer controller 184A produces an overfill indication when the count value of counter 180A reaches the burst size value. The overfill indication enables the counting of counter 180B at the PR rate. Policer controller 184B generates a TX/DROP signal that indicates to the packet processor to forward a directly-received packet that has been consumed, or to discard the packet otherwise.

The embodiments described above are given by way of example, and other suitable embodiments can also be used.

Although the embodiments described herein mainly address traffic policing in MC-LAG, the methods and systems described herein can also be used in other applications, such as in providing Ethernet services, e.g., the Metro Ethernet services by the Metro Ethernet Forum (MEF).

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
multiple ports, configured to connect to a communication network, including:
an output port that connects to a network node via a first member link of a Multi-Chassis—Link Aggregation Link Group (MC-LAG); and
one or more inter-peer ports that connect to one or more peer network elements that are connected to the network node via other member links of the MC-LAG; and
a processor, configured to:
receive via one or more input ports first packets that are destined to the network node, the first packets having a first ingress rate;
receive via the one or more inter-peer ports information indicative of at least some of second packets that the peer network elements receive from the communication network at respective second ingress rates and that are destined to the network node;
select at least some of the received first packets for transmission to the network node at an egress rate that jointly with egress rates of the peer network elements does not exceed a maximal rate predefined for the MC-LAG, based on the first packets and the information received from the peer network elements; and
transmit the selected first packets to the network node via the first member link at the egress rate.

2. The network element according to claim 1, wherein the first packets have respective first sizes, wherein the information received from the peer network elements comprises respective second sizes of at least some of the received second packets, wherein the processor is configured to select the at least some of the first packets for transmission to the network node based on the first sizes and the second sizes.

3. The network element according to claim 2, wherein the processor is configured to select the at least some of the first packets by accumulating tokens at the maximal rate, determining a token level of the accumulated tokens, consuming at least some of the accumulated tokens based on the token level, the first sizes and the second sizes, and selecting a first packet that has been consumed.

4. The network element according to claim 3, wherein the processor is configured to consume a first size of a first packet or a second size of a second packet, when the token level is larger than or equal to the first size or the second size, respectively.

5. The network element according to claim 3, wherein the processor is configured to consume a first size of a first packet when the token level is larger than or equal to the first size, and to consume a second size of a second packet even when the token level is smaller than the second size.

6. The network element according to claim 3, wherein the processor is configured to select a first packet for transmission when the token level is larger than or equal to a size of the first packet, and to discard the first packet otherwise.

7. The network element according to claim 3, wherein the processor is configured to accumulate first tokens at the maximal rate, and second tokens comprising excessive first tokens above a predefined burst size, and to consume the accumulated first and second tokens based on second sizes of the second packets and first sizes of the first packets, respectively.

8. The network element according to claim 1, wherein the at least some of the second packets comprise second packets that the peer network elements actually egress to the other member links.

9. The network element according to claim 1, wherein the processor is configured to report a first size of a received first packet to one or more peer network elements, by mirroring a header of the first packet that carries the first size, via the inter-peer ports.

10. A method for communication, comprising:
in a network element that connects to a communication network using multiple ports, including an output port that connects to a network node via a first member link of a Multi-Chassis—Link Aggregation Link Group (MC-LAG), and one or more inter-peer ports that connect to one or more peer network elements that are connected to the network node via other member links of the MC-LAG,
receiving via one or more input ports first packets that are destined to the network node, the first packets having a first ingress rate;
receiving via the one or more inter-peer ports information indicative of at least some of second packets that the peer network elements receive from the communication network at respective second ingress rates and that are destined to the network node;
selecting at least some of the first packets for transmission to the network node at an egress rate that jointly with egress rates of the peer network elements does not exceed a maximal rate predefined for the MC-LAG, based on the first packets and the information received from the peer network elements; and
transmitting the selected first packets to the network node via the first member link at the egress rate.

11. The method according to claim 10, wherein the first packets have respective first sizes, wherein the information received from the peer network elements comprises respective second sizes of at least some of the received second packets, and wherein selecting the at least some of the first packets for transmission to the network node comprises selecting the at least some of the first packets based on the first sizes and the second sizes.

12. The method element according to claim 11, wherein selecting the at least some of the first packets comprises accumulating tokens at the maximal rate, determining a token level of the accumulated tokens, consuming at least some of the accumulated tokens based on the token level, the first sizes and the second sizes, and selecting a first packet that has been consumed.

13. The method according to claim 12, wherein consuming the accumulated tokens comprises consuming a first size of a first packet or a second size of a second packet, when the token level is larger than or equal to the first size or the second size, respectively.

14. The method according to claim 12, wherein consuming the accumulated tokens comprises consuming a first size of a first packet when the token level is larger than or equal to the first size, and consuming a second size of a second packet even when the token level is smaller than the second size.

15. The method according to claim 12, wherein selecting the at least first packets comprises selecting a first packet for transmission when the token level is larger than or equal to a size of the first packet, and discarding the first packet otherwise.

16. The method according to claim 12, wherein accumulating the tokens comprises accumulating first tokens at the maximal rate, and accumulating second tokens comprising excessive first tokens above a predefined burst size, and wherein consuming the accumulated tokens comprises consuming the accumulated first and second tokens based on second sizes of the second packets and first sizes of the first packets, respectively.

17. The method according to claim 10, wherein the at least some of the second packets comprise second packets that the peer network elements actually egress to the other member links.

18. The method according to claim 10, and comprising reporting a first size of a received first packet to one or more peer network elements by mirroring a header of the first packet that carries the first size, via the inter-peer ports.

19. An apparatus for communication, comprising:
multiple network elements, coupled to a network node in a Multi-Chassis—Link Aggregation Link Group (MC-LAG) configuration, wherein each of the network elements is configured to:
receive from a communication network packets that are destined to the network node over the MC-LAG, the received packets having a respective ingress rate;
receive from the other network elements information indicative of at least some of the packets that the other network elements receive from the communication network and that are destined to the network node;
select at least some of the received packets for transmission to the network node at an egress rate that jointly with egress rates of the other network elements does not exceed a maximal rate predefined for the MC-LAG, based on the packets and the information received from the other network elements; and
transmit the selected packets to the network node via a member link of the MC-LAG at the egress rate.

20. A method for communication, comprising:
in each of multiple network elements that are coupled to a network node in a Multi-Chassis—Link Aggregation Link Group (MC-LAG) configuration:
receiving from a communication network packets that are destined to the network node over the MC-LAG, the received packets having a respective ingress rate;
receiving from the other network elements, information indicative of at least some of the packets that the other network elements receive from the communication network and that are destined to the network node;
selecting at least some of the received packets for transmission to the network node at an egress rate that jointly with egress rates of the other network elements does not exceed a maximal rate predefined for the MC-LAG, based on the received packets and the information received from the other network elements; and
transmitting the selected packets to the network node via a member link of the MC-LAG at the egress rate.

* * * * *